United States Patent
Zakharov

(10) Patent No.: US 11,134,047 B2
(45) Date of Patent: Sep. 28, 2021

(54) SYSTEM AND METHOD OF COMMUNICATION BETWEEN EMAIL PLUGINS

(71) Applicant: KYOCERA Document Solutions Inc., Osaka (JP)

(72) Inventor: Oleg Y. Zakharov, Walnut Creek, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 299 days.

(21) Appl. No.: 16/368,004

(22) Filed: Mar. 28, 2019

(65) Prior Publication Data
US 2020/0314049 A1    Oct. 1, 2020

(51) Int. Cl.
*G06F 15/16* (2006.01)
*H04L 12/58* (2006.01)

(52) U.S. Cl.
CPC .................................. *H04L 51/18* (2013.01)

(58) Field of Classification Search
CPC ......... H04L 51/18; H04L 67/02; H04L 51/34; G06Q 10/107; G06Q 10/0633; G06Q 10/10
See application file for complete search history.

(56) References Cited

U.S. PATENT DOCUMENTS

| | | | | |
|---|---|---|---|---|
| 6,594,636 B1 * | 7/2003 | Sakaguchi | ........... | G06Q 10/063 705/7.11 |
| 7,191,252 B2 | 3/2007 | Redlich et al. | | |
| 7,519,976 B2 * | 4/2009 | Blevins | ................... | G06Q 10/06 719/328 |
| 7,669,051 B2 | 2/2010 | Redlich et al. | | |
| 10,162,624 B1 * | 12/2018 | Moturu | ................ | G06F 9/44521 |
| 10,956,179 B1 * | 3/2021 | Moturu | ..................... | G06F 8/20 |
| 2008/0005024 A1 | 1/2008 | Kirkwood | | |
| 2011/0264745 A1 | 10/2011 | Ferlitsch | | |
| 2014/0074544 A1 * | 3/2014 | Seetharam | ....... | G06Q 10/06316 705/7.26 |
| 2016/0142350 A1 * | 5/2016 | Mutha | ..................... | H04L 51/04 709/206 |
| 2017/0232300 A1 | 8/2017 | Tran et al. | | |
| 2018/0054414 A1 * | 2/2018 | LeVasseur | ............ | G06F 21/606 |
| 2019/0279157 A1 * | 9/2019 | Eapen | ................ | H04L 63/0807 |
| 2019/0332754 A1 * | 10/2019 | Andersen | ........... | G06K 9/00892 |
| 2020/0304450 A1 * | 9/2020 | Daniali | .................... | H04L 51/36 |

OTHER PUBLICATIONS

Gorbonosov, et al.; Plugin-based analysis framework for LHC post-mortem analysis; 2013; Proceedings of ICALEPCS2013; pp. 1-3 (Year: 2013).*

* cited by examiner

*Primary Examiner* — Oleg Survillo
(74) *Attorney, Agent, or Firm* — Lawrence N. Ginsberg

(57) ABSTRACT

A system and method for enhanced workflow over email assisted by a plurality of plugins associable to a plurality of email clients is described herein. A first plugin is associable with a first email client. The first plugin is configured to write to a custom command wherein the custom command includes a machine readable message with one or more authorized actions within an email exchanged between the first email client and a second email client. A second plugin is associable with the second email client. The second plugin is configured to read from the custom command and execute the one or more authorized actions related to the second email client.

20 Claims, 5 Drawing Sheets

```
<plugin_transaction>
    <process_command>
        <sender_plugin_id>123456</sender_plugin_id>
        <display_name>'Travel expense report'</display_name>
        <initiated_by>'John Smith'</initiated_by>
        <process_by>01/02/2020</process_by>
        <execute_request>Approval</execute_request>
        <require_digital_signature>True</require_digital_signature>
        <allow_local_copy>False</allow_local_copy>
    </process_command>
    <process_status>Completed</process_status>
</plugin_transaction>
```

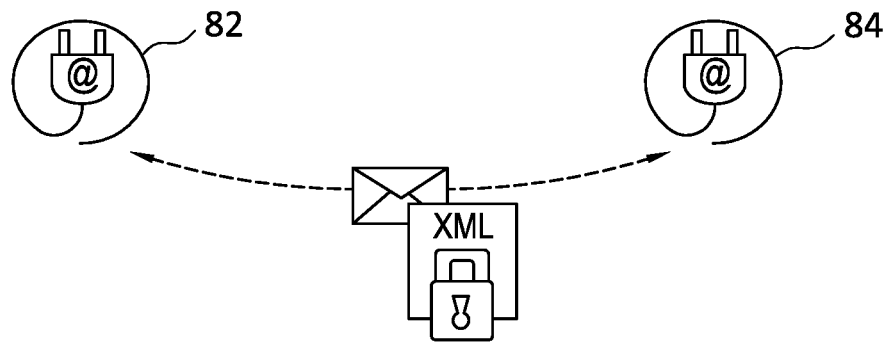

FIG. 7

```
<plugin_transaction>
    <process_command>
        <sender_plugin_id>123456</sender_plugin_id>
        <display_name>'Travel expense report'</display_name>
        <initiated_by>'John Smith'</initiated_by>
        <process_by>01/02/2020</process_by>
        <execute_request>Approval</execute_request>
        <require_digital_signature>True</require_digital_signature>
        <allow_local_copy>False</allow_local_copy>
    </process_command>
    <process_status>Completed</process_status>
</plugin_transaction>
```

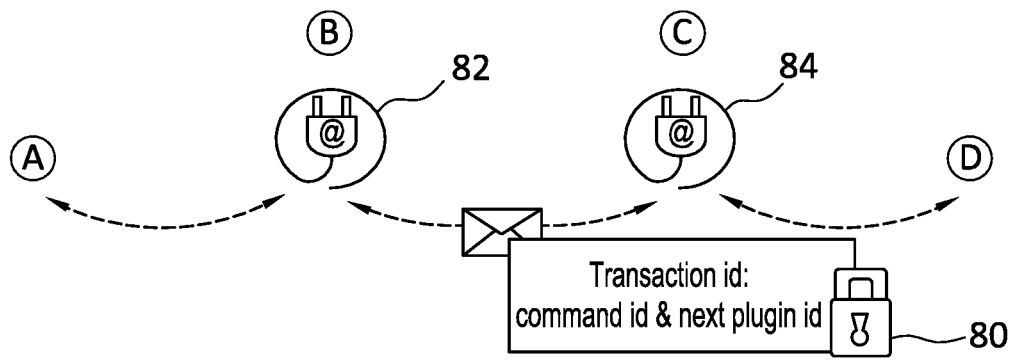

FIG. 8

SYSTEM AND METHOD OF COMMUNICATION BETWEEN EMAIL PLUGINS

BACKGROUND OF THE INVENTION

1. Field of the Invention

The present invention relates generally to enhancing workflow over email and, more particularly to the use of plugins for improved email communication.

2. Description of the Related Art

Many email clients, such as Microsoft Outlook, allow software components to be customized by supporting plugins. Plugins can monitor incoming emails, communicate with other recipients through address books, and automate end-user activities. In computing, a plug-in (or plugin, add-in, addin, add-on, or addon) is a software component that adds a specific feature to an existing computer program. In this disclosure, a plugin is a locally installed software instance of an application that is accessible within an email client (which monitors incoming emails).

Currently, electronic mail exchange is a primary communication protocol between and within enterprises. Sharing and processing electronic documents between business entities is common. Often documents are attached to emails and exchanged between responsible parties for further processing. A full cycle of the business document process is desired to be automated to minimize human mistakes and save document processing resources.

A sequence of document processing tasks is often called a 'document processing workflow', or simply—workflow. Most workflow systems have a central application, database or email servers, where workflow schemas are defined globally for all connected business entities. In such cases, typically IT personnel/third-party experts need to learn the flow (steps) of the business process and develop document processing workflow schemas, for example running on a MS Exchange server. Even, in many cases where each enterprise (company) supports its own email servers, such as MS Exchange servers, it is very common, that incoming emails across enterprises, are supported by a certain workflow schema.

The workflow schema includes descriptions of the processing steps for the electronic documents, such as: initiating a new document, updating a document, approving a document, etc. Also, the workflow schema includes rules of business entities (participants) and permissions of every participant. For example one participant cannot delete or update a document, while another participant has full permissions on a document that he/she has initiated. Sometimes it is difficult to define unified workflow schema because the number of business entities can be large and distributed across enterprises.

Many existing systems and methods are related to document processing via emails, where the electronic documents are attached to the email and sent to recipients within or across enterprises. In this case, an email includes addresses of the sender and recipient. The attachment documents are associated with a certain step of the workflow schema.

SUMMARY OF THE INVENTION

In a broad aspect, the present invention is embodied as a system for enhanced workflow over email assisted by a plurality of plugins associable to a plurality of email clients. A first plugin is associable with a first email client. The first plugin is configured to write to a custom command wherein the custom command includes a machine readable message with one or more authorized actions within an email exchanged between the first email client and a second email client. A second plugin is associable with the second email client. The second plugin is configured to read from the custom command and execute the one or more authorized actions related to the second email client.

In another broad aspect, the present invention is embodied as a method for enhanced workflow over email assisted by a plurality of plugins associable to a plurality of email clients. In a first step, a unique identifier is generated including a device ID and an email address unique to a first plugin associable with a first email client. An initiation and authorization request is then sent, with the unique identifier, from the first plugin to a second plugin associable with a second email client. A positive response to the initiation and authorization request is received from the second plugin, with one or more authorized actions. A machine readable message is sent from the first plugin within an email exchanged between the first email client and the second email client. The machine readable message includes a custom command with at least one of the authorized actions.

In another broad aspect, the present invention is embodied as a non-transitory computer-readable medium. The non-transitory computer-readable medium stores computer program instructions to provide enhanced workflow over email, assisted by plugins associable to email clients. The instructions for a first plugin includes (A) generating a unique identifier comprising a device ID and an email address unique to the first plugin associable with a first email client; (B) generating an initiation and authorization request comprising the unique identifier, said request being configured to be sent to a second plugin associable with a second email client; (C) receiving a positive response to the initiation and authorization request from the second plugin; and (D) providing one or more authorized actions to the second plugin in a custom command related to the second email client.

BRIEF DESCRIPTION OF THE DRAWINGS

FIG. 7 illustrates plugins exchanging computer-readable extensions within emails.

FIG. 8 illustrates an example of a message format exchanged between plugins.

DETAILED DESCRIPTION OF THE INVENTION

As will be disclosed below, the present innovation involves a process of customization of a workflow system by utilizing email plugin software, along with custom commands (optionally encrypted message(s)) executed by the plugins. The custom commands can have a common command descriptor. One of the fields of the descriptor can indicate whether the commands are encrypted. The email plugins can use an OPENSSL private key and public key encryption/decryption scheme to communicate between peers. The commands are encrypted by the private key of the plugins sending out commands and decrypted by the public keys of the plugins receiving the commands. Each instance of an installed plugin has a protocol to exchange additional commands based on an agreement between peers. The plugin software components can be run under an email client, such as Microsoft Outlook, and can process documents according to received messages in machine-readable format. Thus, the present innovation involves network communication between different instances of plugins. The communication between plugins provides improvement of workflow automation.

Figure 1:
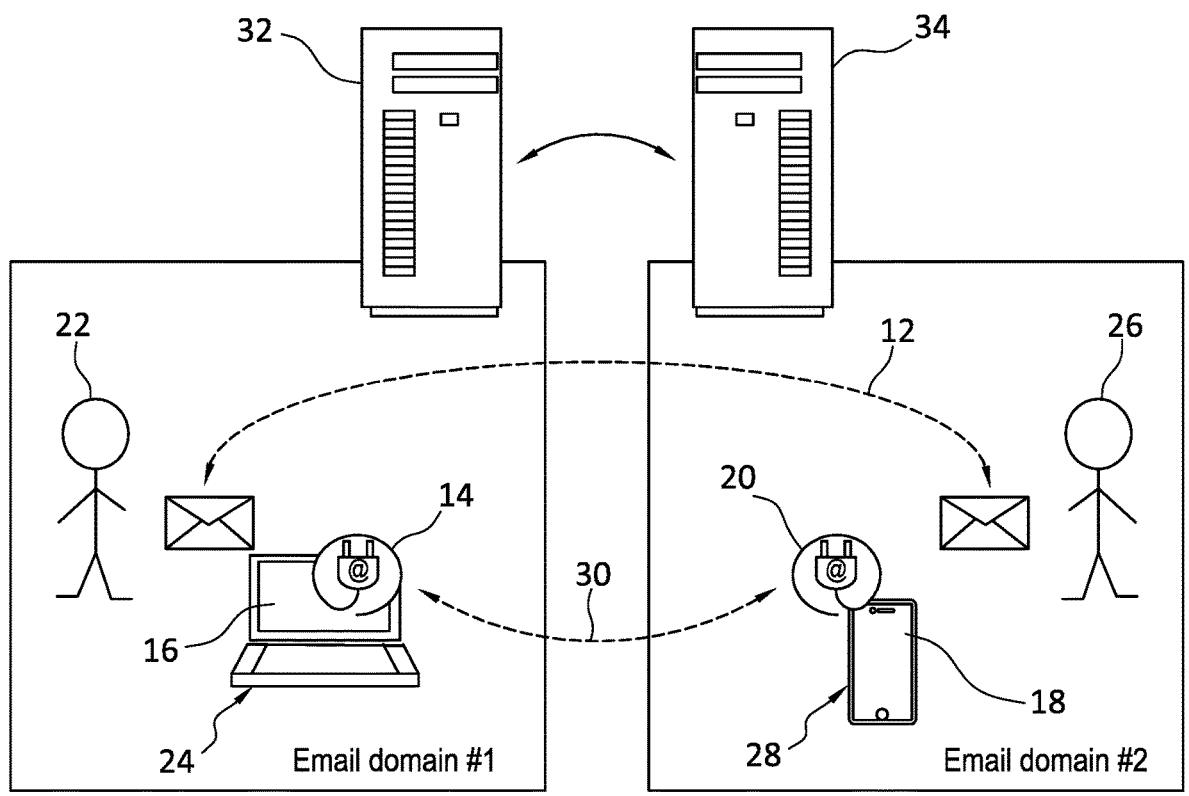
FIG. 1 is a simplified diagram showing communication between email plugins with custom commands to be executed, in accordance with the principles of the present invention.

Referring now to the drawings and the characters of reference marked thereon, FIG. 1 illustrates a system 10 for enhanced workflow over email 12. A first plugin 14 is associable with a first email client 16. The first plugin 14 is configured to write to a custom command wherein the custom command comprises a machine readable message with one or more authorized actions within the email 12 exchanged between the first email client 16 and a second email client 18. A second plugin 20 is associable with the second email client 18. The second plugin 20 is configured to read from the custom command and execute the one or more authorized actions related to the second email client 18. The machine readable message is defined by a common command descriptor. The command descriptor defines the logical meaning of a command: how many fields it has, the meaning of each field, the valid values for each field, whether the command is set to be encrypted etc. The first plugin 14 and the second email plugin 20 are preconfigured with proper security settings based on privileges of user 22 and user 26. The commands of the first plugin 14 that can be sent out are restricted by security settings during configurations. The commands of the second plugin 20 that can be processed are also restricted by its security setting during configurations. The first plugin 14 and the second plugin 20 can be with the same email domain, i.e. both of them belong to the same organization, or they can be with different email domains, i.e. they belong to different organizations. When the first plugin 14 and the second plugin 20 are with the same organization, both of them will communication with one email exchange server 32 via email client 16 and email client 18. When the first plugin 14 and the second plugin 20 are with the different organizations, the first plugin 14 will communication with one email exchange server 32 via email client 16 and the first email exchange server 32 will communicate with a second email exchange server 34. The second email exchange server 34 will communicate with the second plugin 20 via the second email client 18.

Each plugin 14, 20 is associated with a unique device. For example, one user 22 has installed a plugin 14 on his/her computer 24, while another user 26 has installed a plugin 20 on his/her device 28. Both users settle an agreement 30 of plugins communication by exchanging encrypted information. Two mail servers 32, 34 support email communication between the two computers 24, 28. As used herein the term "computer" is defined broadly to include, for example, mobile devices, as shown in FIG. 1. The agreement may be time limited. If the user 22 chooses to send out an encrypted command for enhanced security reasons, the command will be encrypted by the first plugin 14 with the private key of the user 22 and can only be decrypted by public keys of plugins of recipients. In the example shown in FIG. 1, there is only one recipient the user 24. The command sent by the user 22 can only be decrypted by the plugin 20.

In one example of use, an employee/user travels very often, and he/she needs to submit travel expenses, for example on a weekly or monthly basis. The user initiates a new email, attaching a travel report file/document from a local computer storage, and submits the email to a specific recipient for further processing. In another example, an employee/user forwards an email for approval to a manager. The plugin might automatically save an attachment from that incoming email and forward a renamed file to a manager for approval. The plugin might also track deadlines of processed documents. If needed, the plugin is able to send a remainder about an approaching deadline.

Such examples support workflow automation only between two business entities without using a central server as a workflow manager. Each business entity works as an individual part of a collaborative system, and each email plugin recognizes authorized incoming recipients and outgoing email addresses.

Figure 2:
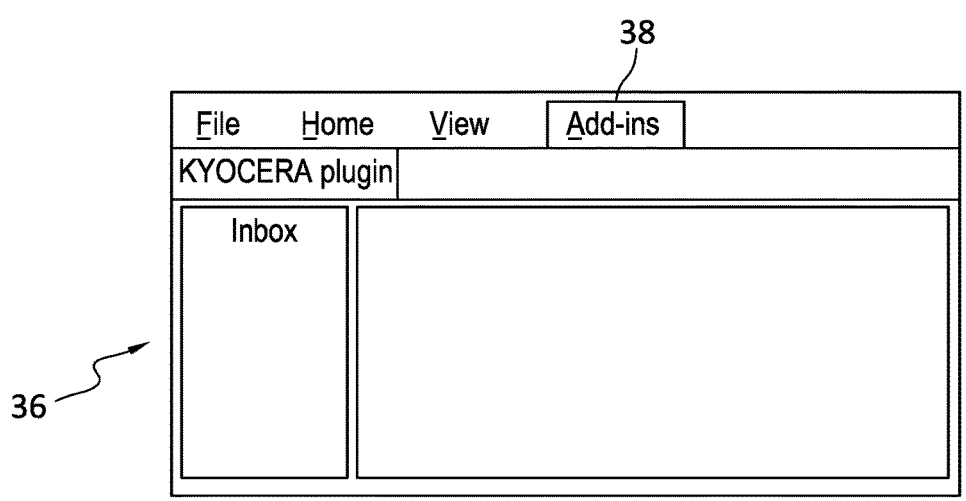
FIG. 2 illustrates an example user interface with a custom plugin used with an email application.
Figure 3:
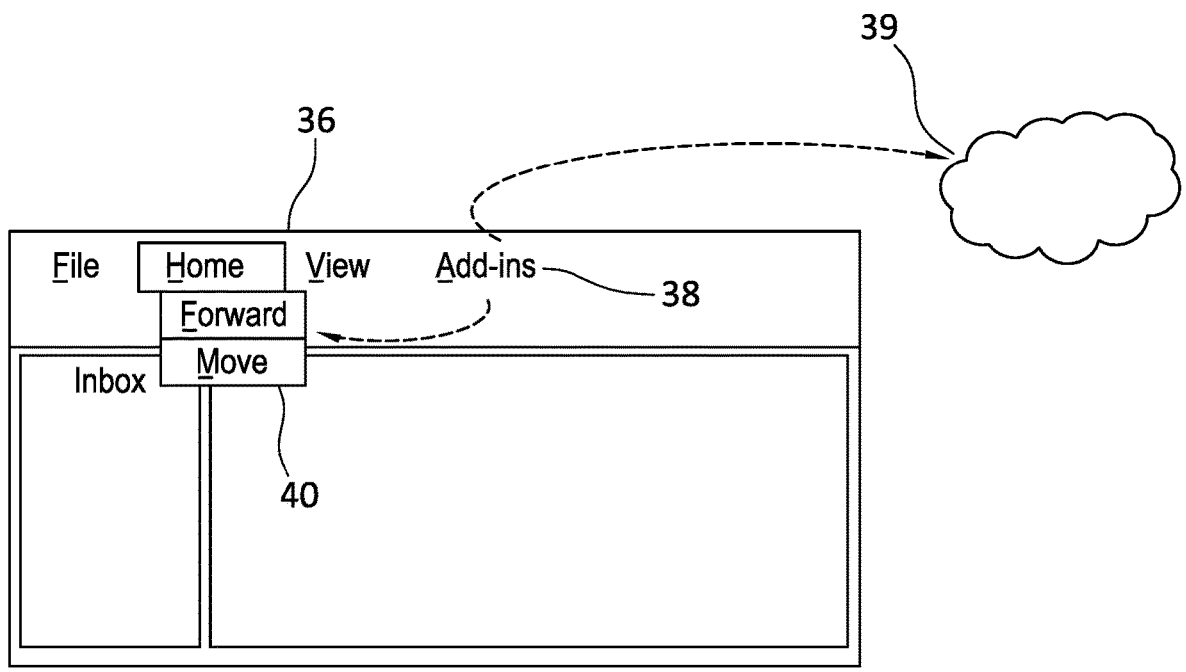
FIG. 3 illustrates use of the pre-built email commands of the plugin and also illustrates use of an external service provider.

Referring now to FIGS. 2-3, the user's interface of email application, i.e. Microsoft Outlook, designated generally as 36, with a custom plugin 38, in accordance with the present system, is illustrated. Custom plugin 38 is shown within email application window of the user, where the custom plugin 38 has permission to execute standard commands 40 of the user's email application, such as ability to move, forward, create, modify, read a local document, track incoming or existing emails, create calendar items, set up meetings reminder, etc. As shown in FIG. 3, a plugin may be configurable to allow exchange of additional information with an external service provider 39. Such service providers may include, for example, online ecommerce systems or online payment systems (via, for example, (Representational State Transfer) REST API) or social networking websites.

Figure 4:
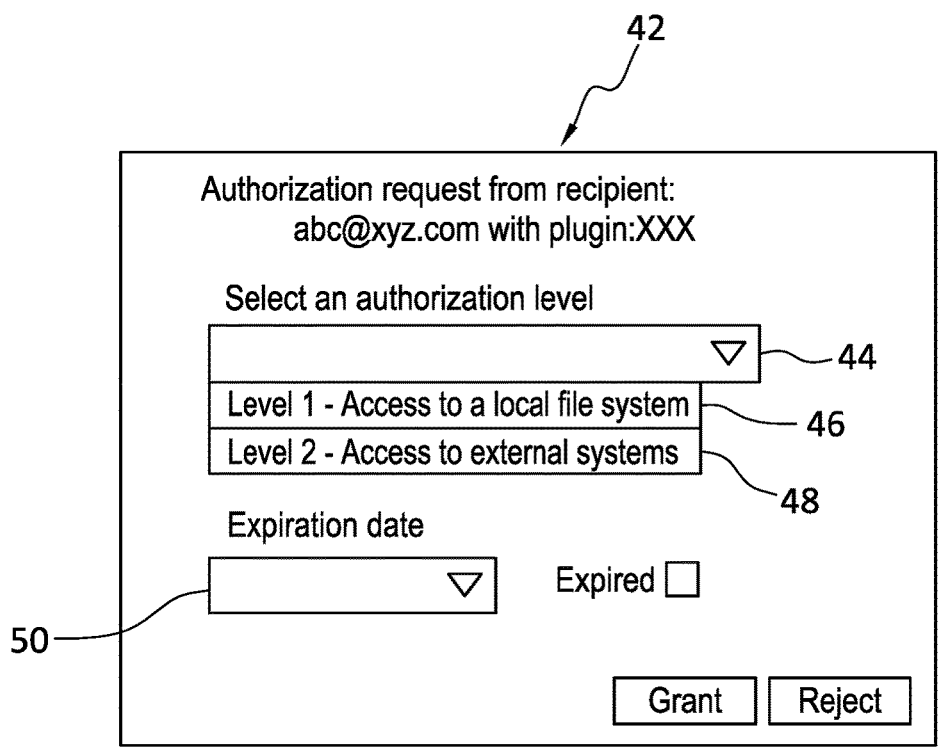
FIG. 4 illustrates an example of a user interface dialog box granting or rejecting authorization.

Referring now to FIG. 4, an example user interface (UI) dialog provided by the receiver's plugin is illustrated, designated generally as 42. The plugins have to be authorized to communicate with each other (peer-to-peer) in order to have access to the resources of the users' devices. The receiver's plugin provides a UI dialog to grant a desired level of authorization 44 based on a sender's plugin request to the receiver. For example, the sender's plugin can request to provide an access to a local file system 46 or local hard drive. Another option could be to grant access to an external system (e.g. provider as discussed above). Additionally, the dialog box 42 can have an option to provide an expiration date 50 of the authorized request, which can be set by the receiver. For example, the authorization may be limited to the duration of a business trip. The dialog box 42 can include UI buttons to grant or reject the authorization request.

Figure 5:
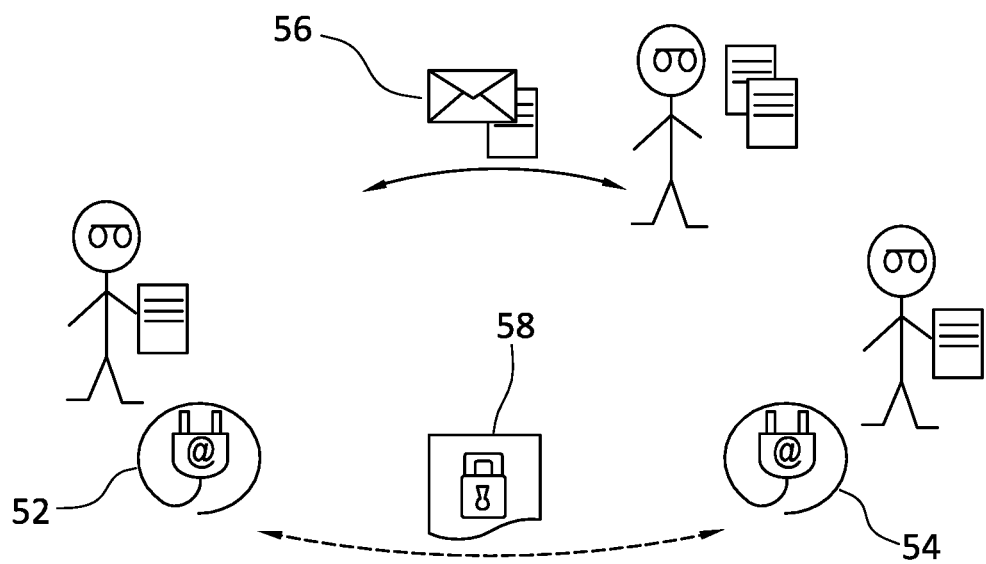
FIG. 5 illustrates a plugin sender and a plugin receiver exchanging encrypted messages.

As shown in FIG. 5, a plugin sender 52 and plugin receiver 54 can exchange encrypted messages 56, as shown by encryption icon 58.

There are common solutions to generate and execute macros under custom plugins using programming language such as Visual Basic for Applications (VBA). However, these solutions typically run in the local computer or get distributed within a certain enterprise by using local domain servers. For example, a Microsoft Exchange server installed and running within a local network can support and distribute macros to the local computer.

Figure 6:
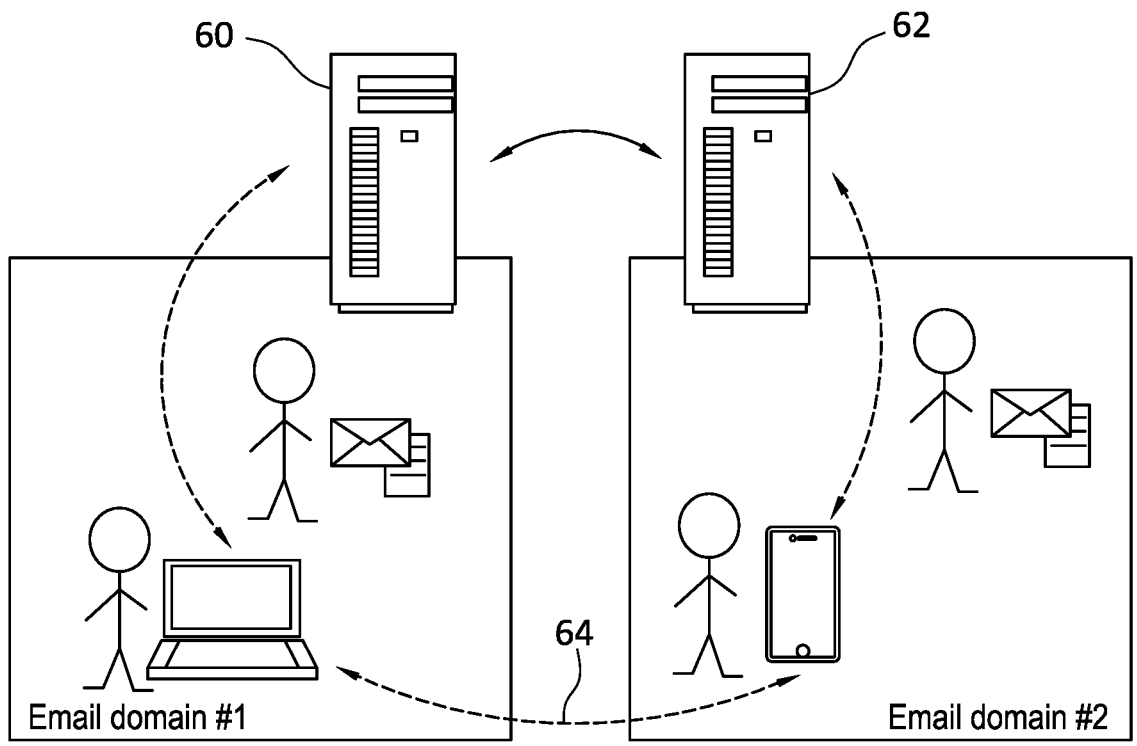
FIG. 6 illustrates communications between enterprise email domains.

Referring now to FIG. 6, communication between enterprise email domains is illustrated. Two email servers 60 and 62 support email communications between two domains. In existing solutions, executable commands, and macros are typically allowed only within the local network; but not between servers 60 and 62. The present invention provides for the exchange and execution of commands between enterprise domains by building an authorized, trustable network, based on an authorization agreement 64. Thus, a plurality of email plugins may be installed on a plurality of user devices that are on different networks and a subset of the one or more authorized actions are available to be executed by the plugins.

In some embodiments, as shown in FIG. 7, plugins 82, 84 can exchange computer-readable extensions within emails, such as a XML attachment.

As it can be seen in FIG. 8, each plugin can act as a single executing point of a workflow schema. The plugin can only communicate with a 'previous' and 'next' stage of an authorized workflow. For example, a workflow may comprise of multiple stages A, B, C, D and so on. As discussed herein, the plugin executing at stage B would only be authorized to communicate with the plugin executing stage A or C, and not stage D.

Email forms typically include common fields, such as 'Subject', 'To . . . ', 'Cc . . . ', and certain custom fields. Some custom fields can be used to transmit additional commands readable by a receiver plugin. Also, plugin commands (commands that can be executed by receiver plugin) can be simply attached to the email in a format of XML messages, i.e. FIG. 7, or encrypted messages that only two plugins, 82 and 84, can encrypt and decrypt by sharing a cryptographic key 80. If two plugins do not have an agreement to share encrypted information, the receiver cannot decrypt the encrypted command. Only after authorization agreement between the two plugins is reached, can the receiver exchange and execute the sender's commands. An example of a message format exchange between the plugins is shown in FIG. 8.

Figure 9:
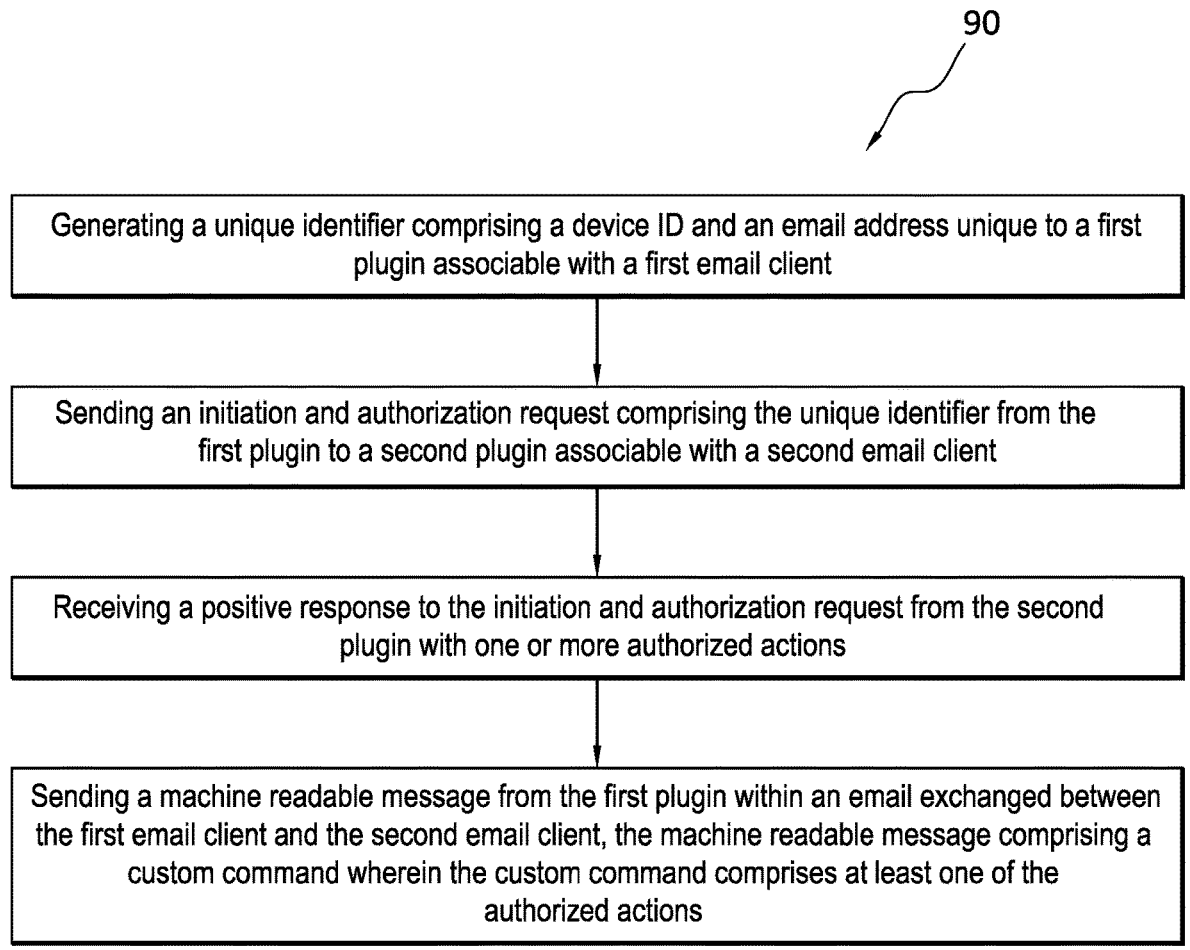
FIG. 9 illustrates a flow chart of the major steps of the communication between peer plugins.

Referring now to FIG. 9, a flow chart of the major steps of the method for enhanced workflow over email assisted by a plurality of plugins associable to a plurality of email clients, is illustrated, designated generally as 90. An email plugin is installed. A unique identifier associated with an individual device, i.e. device ID; and, email address unique to that first plugin, is generated. Using the unique identifier, an initiation and authorization request is sent from the first plugin to a second plugin associable with a second email client. The receiver's plugin is able to send a confirmation message back to the sender plugin. If a positive response is received to the initiation, granting an authorization level, authorized commands can be executed. A machine readable message is sent from the first plugin within an email exchanged between the first email client and the second email client. The machine readable message comprises a custom command wherein the custom command comprises at least one of the authorized actions. The communication and agreement can be periodically reviewed (or renewed) between any two plugins.

In some cases, due to security reasons, the receiver plugin can choose not to communicate with the sender plugin based on the established agreements. In these cases the attached command sent by the sender plugin will be ignored and the sender plugin identifier will be blocked. The receiver plugin, in some embodiments, can archive all the attempted attached commands from unauthorized sender plugins and generate reports for audit purposes. Therefore, an authorized network between the plugins cannot be built, and the communication is not allowed. However, if the authorized action is approved by the receiver, an authorized network is built, which comprises plugins that successfully communicate on the basis of valid agreements. Furthermore, once the authorized network is built, an indication can be provided to the second email client.

Thus, communication between the first plugin and the second plugin is a function of an agreement between the first plugin and the second plugin to define a set of rules or permissions over the actions to update information to be exchanged between the first plugin and the second plugin. The step of verifying validity of the agreement may include checking an expiration date associated with the agreement. In some embodiments, the sender plugin can send a list of commands that the receiver needs to confirm before further execution.

In accordance with the principles described herein, non-transitory computer-readable medium storing computer program instructions to provide enhanced workflow over email assisted by a plurality of plugins associable to a plurality of email clients, can include the instructions for a first plugin, including:

(A) generating a unique identifier comprising a device ID and an email address unique to the first plugin associable with a first email client;
(B) generating an initiation and authorization request comprising the unique identifier, said request being configured to be sent to a second plugin associable with a second email client;
(C) receiving a positive response to the initiation and authorization request from the second plugin; and
(D) providing one or more authorized actions to the second plugin in a custom command related to the second email client.

In some embodiments the instructions may further include receiving an indication that the one or more authorized actions have been executed at the second email client.

In one use case, security of "Pretty Good Privacy" communication can be increased by monitoring authorized actions of the email recipients, in accordance with the principles of the present invention. For instance a plugin can receive the document after a confirmation between a sender and recipient.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), General Purpose Processors (GPPs), Microcontroller Units (MCUs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of some of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

As mentioned above, other embodiments and configurations may be devised without departing from the spirit of the invention and the scope of the appended claims.

What is claimed is:

1. A method for enhanced workflow over email assisted by a plurality of plugins associable to a plurality of email clients, comprising:
   generating a unique identifier comprising a device ID and an email address unique to a first plugin associable with a first email client;
   sending an initiation and authorization request comprising the unique identifier from the first plugin to a second plugin associable with a second email client;
   receiving a positive response to the initiation and authorization request from the second plugin with one or more authorized actions; and
   sending a machine readable message from the first plugin within an email exchanged between the first email client and the second email client, the machine readable message comprising a custom command wherein the custom command comprises at least one of the authorized actions,
   wherein each of said plurality of plugins is configured to act as a simile executing point of a workflow schema, each plugin only capable of communicating with a 'previous' and 'next' stage of an authorized workflow.

2. The method of claim 1, further comprising the step of receiving an indication that the one or more authorized actions have been executed at the second email client.

3. The method of claim 1 wherein communication between the first plugin and the second plugin is a function of an agreement between the first plugin and the second plugin to define a set of rules or permissions over the actions to update information to be exchanged between the first plugin and the second plugin, further comprising the step of verifying validity of the agreement by checking an expiration date associated with the agreement.

4. The method of claim 1, further comprising a step of ignoring the custom command from the first plugin by blocking the unique identifier for security purposes, if the initiation and authorization request is rejected by the second plugin.

5. A system for enhanced workflow over email assisted by a plurality of plugins associable to a plurality of email clients, comprising:
   a plurality of computers, each computer of said plurality of computers being configured to install plugins for email clients;
   a plurality of plugins, comprising:
   a first plugin associable with a first email client, the first plugin configured to write to a custom command wherein the custom command comprises a machine readable message with one or more authorized actions within an email exchanged between the first email client and a second email client; and
   a second plugin associable with the second email client, the second plugin configured to read from the custom command and execute the one or more authorized actions related to the second email client,
   wherein said plurality of plugins are installed on a plurality of computers that are on different networks, and
   wherein each of said plurality of plugins is configured to act as a single executing point of a workflow schema, each plugin only capable of communicating with a 'previous' and 'next' stage of an authorized workflow.

6. The system of claim 5, wherein communication between the first plugin and the second plugin is a function of an agreement between the first plugin and the second plugin to define a set of rules or permissions over the one or more authorized actions to update information to be exchanged between the first plugin and the second plugin.

7. The system of claim 5 wherein at least one of the plurality of plugins is configurable to allow exchange of additional information with an external service provider.

8. The system of claim 7 further comprising an external service provider that is configurable to communicate with the first plugin.

9. The system of claim 8 wherein the first plugin is installed on a first email client configured for a first email domain and the second plugin is installed on a second email client configured for a second email domain.

10. The system of claim 6 wherein the agreement is time limited.

11. The system of claim 5 wherein the custom command exchanged between the first plugin and the second plugin is encrypted.

12. The system of claim 5, wherein a subset of the one or more authorized actions are available to be executed by the plurality of plugins.

13. The system of claim 5, wherein said one or more authorized actions is from the group of authorized actions consisting of:
(A) setting up a meeting;
(B) saving an attachment to a particular folder;
(C) forwarding an email message;
(D) creating a reminder; and
(E) making a payment.

14. The system of claim 5, wherein the first plugin comprises a configuration module to configure initiation and authorization steps to provide communication with the second plugin.

15. The system of claim 5 wherein the first plugin is associated with a unique identifier comprising an email address associated with the first email client and a device running the first email client.

16. A non-transitory computer-readable medium storing computer program instructions to provide enhanced workflow over email assisted by a plurality of plugins associable to a plurality of email clients, the instructions for a first plugin, comprising:
(A) generating a unique identifier comprising a device ID and an email address unique to the first plugin associable with a first email client;
(B) generating an initiation and authorization request comprising the unique identifier, said request being configured to be sent to a second plugin associable with a second email client;
(C) receiving a positive response to the initiation and authorization request from the second plugin; and
(D) providing one or more authorized actions to the second plugin in a custom command related to the second email client,
wherein each of said plurality of plugins is configured to act as a simile executing point of a workflow schema, each plugin only capable of communicating with a 'previous' and 'next' stage of an authorized workflow.

17. The non-transitory computer-readable medium of claim 16 wherein the instructions further comprise:
(E) receiving an indication that the one or more authorized actions have been executed at the second email client.

18. The non-transitory computer-readable medium of claim 16 wherein the instructions further comprise:
verifying validity of an agreement between the first plugin and the second plugin by checking an expiration date associated with the agreement, wherein the agreement defines a set of rules or permissions over the actions to update information to be exchanged between the first plugin and the second plugin.

19. The non-transitory computer-readable medium of claim 16 wherein the instructions further comprise:
providing exchange of additional information with an external service provider.

20. The non-transitory computer-readable medium of claim 16 wherein the agreement is time limited.

* * * * *